(No Model.) 2 Sheets—Sheet 1.
J. W. BEACH.
PNEUMATIC CONVEYER.
No. 444,038. Patented Jan. 6, 1891.
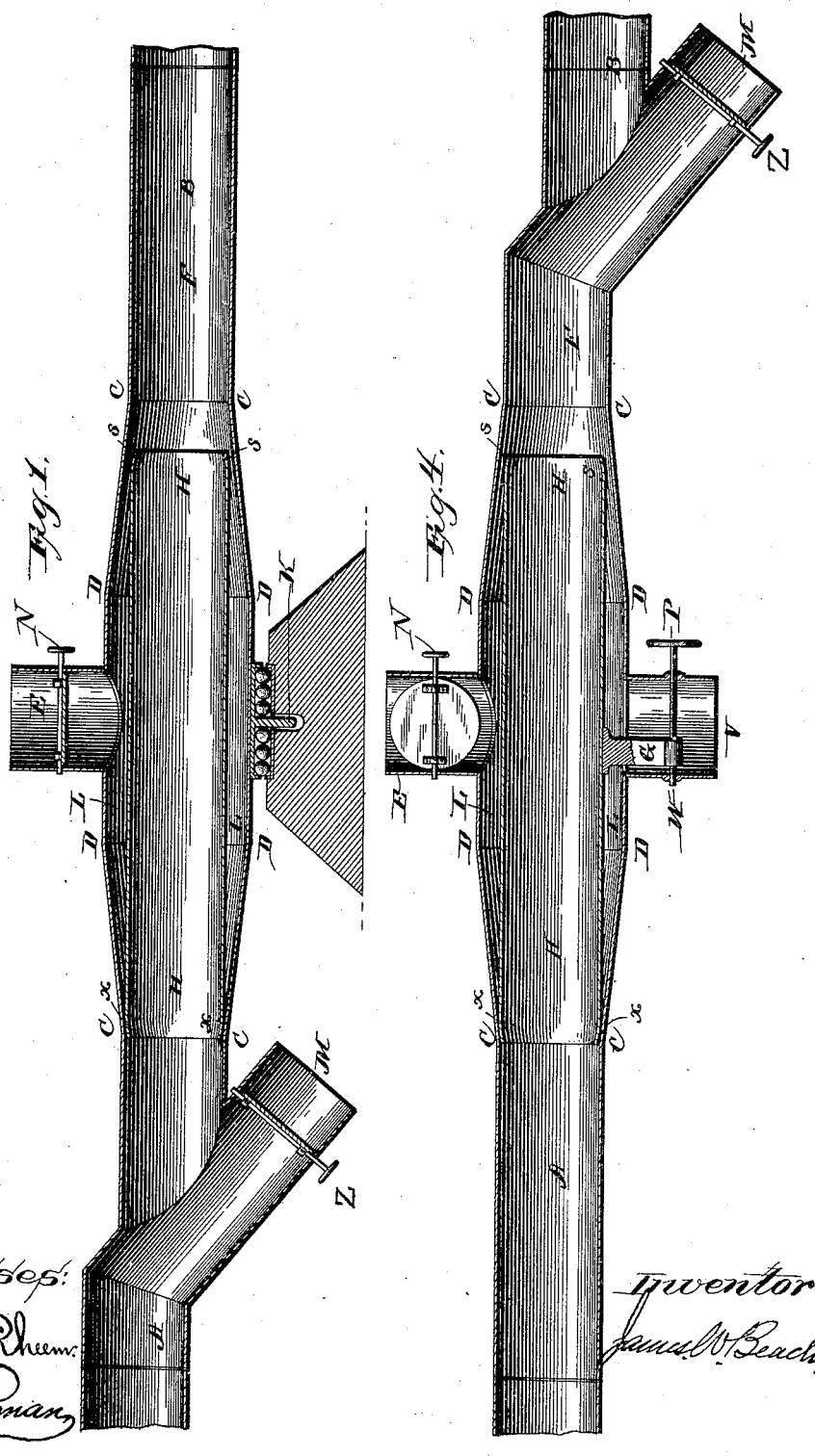

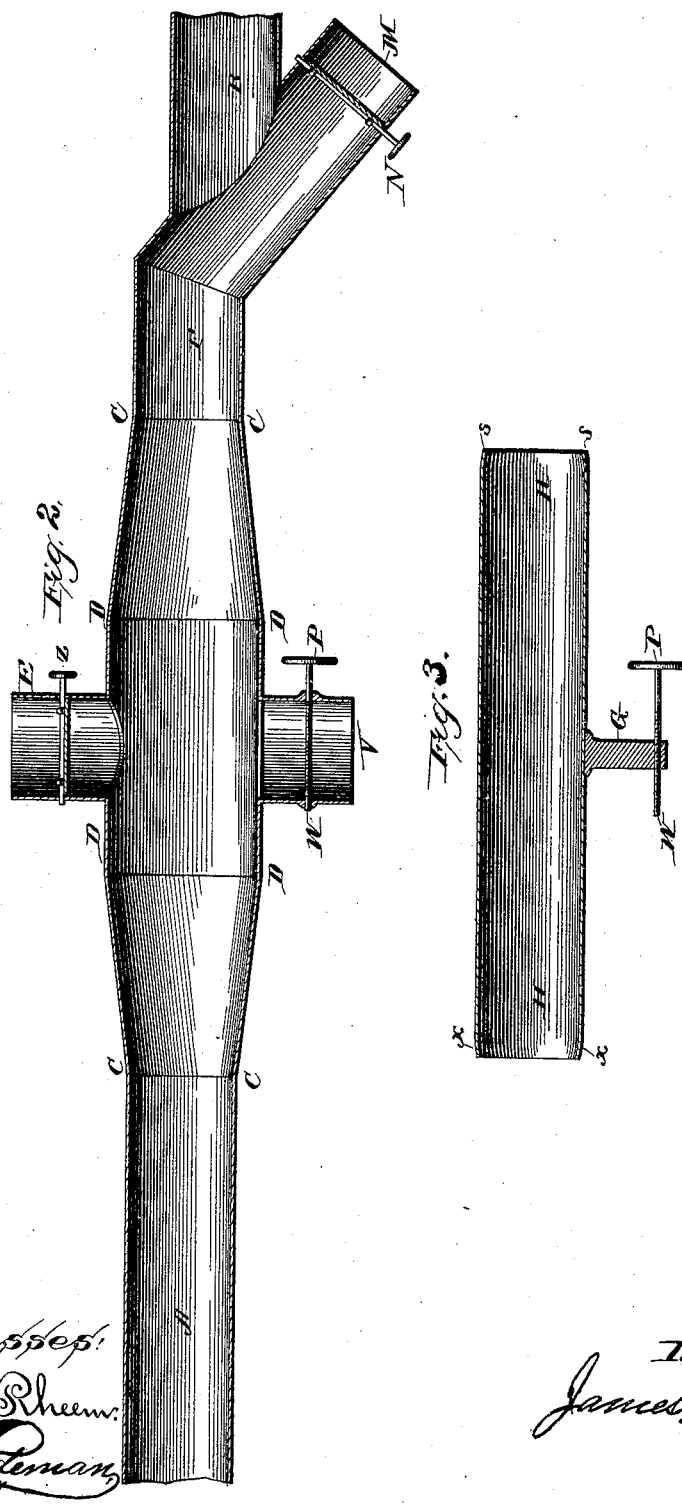

UNITED STATES PATENT OFFICE.

JAMES W. BEACH, OF FERNWOOD, ILLINOIS.

PNEUMATIC CONVEYER.

SPECIFICATION forming part of Letters Patent No. 444,038, dated January 6, 1891.

Application filed August 23, 1890. Serial No. 362,877. (No model.)

*To all whom it may concern:*

Be it known that I, JAMES W. BEACH, a citizen of the United States, residing at Fernwood, in the county of Cook and State of Illinois, have invented certain new and useful Improvements in Pneumatic Conveyers, or machines for pneumatic transportation and for creating and accelerating the speed or velocity of a current of air, gas, or other fluid in pneumatic pipes or other conduits and the commodities therein in transit, of which the following is a specification.

My invention relates to improvements in pneumatic conveyers, by the use of which invention or improvement a current of air, gas, or other elastic fluid (at any desired point or points along the line of a pneumatic pipe having both ends thereof open and unobstructed) can be put in motion in said pneumatic pipe in either direction, as desired, or the velocity of a current of air, gas, or other fluid moving in a pneumatic pipe or conduit can be increased or accelerated.

The objects of my invention are, first, to create a current of air, gas, or other fluid in a pneumatic pipe or other conduit by providing and maintaining, substantially, a continuous current or a large volume of air, gas, or other fluid under pressure at any desired point or points along and between the ends of a pneumatic line, pipe, or conduit, and providing means or mechanism for directing the course of the current created by the escape of said volume from pressure, which said volume or current of air, gas, or other fluid thus directed shall at such point or points be allowed to escape into or be forced into or shall enter said line or pipe under pressure, as aforesaid, and be impelled forward in said line or pipe at great velocity and through the use of my invention or device in the direction desired; second, to increase the velocity of a current of air, gas, or other fluid moving in a pneumatic pipe by forcing, impelling, or allowing to escape from under pressure (at any desired point or points along or between the extreme ends of a pneumatic pipe) into said current at great velocity in the same direction in which said current is moving, and not in an opposite direction, a further, additional, or other volume of air, gas, or other elastic fluid, thus allowing the matter or commodity in course of transportation in said pneumatic pipe to be transported throughout the entire length of said pneumatic pipe, if desired, without stop or delay; third, to create and maintain a current of air, gas, or other elastic fluid throughout the entire length of a pneumatic pipe or conduit (having both ends thereof open and unobstructed) by allowing to escape from under pressure (or by forcing or impelling at great velocity) into said pipe at any desired point or points between the ends of said pneumatic pipe in the direction desired a volume or continuous current of air, gas, or other elastic fluid, and to transport the mails, grain, flour, and all suitable commodities through said pipe by means of said current of air, gas, or other fluid so to be created, as aforesaid; fourth, to create a current of air, gas, or other elastic fluid, or to increase the velocity of a current of air, gas, or other elastic fluid within or moving in a pneumatic pipe by impelling or forcing into said pipe (in the direction desired) at a point between the ends of said pipe a current or large volume of air, gas, or other fluid, and by withdrawing or exhausting the said current or part thereof from said pneumatic pipe at a point forward or in advance of said last-mentioned point, and, fifth, to provide means for operating the machine, so as to accelerate the velocity in or create said current in said pneumatic pipe in either direction, as desired. I attain these objects by the mechanism illustrated in the accompanying drawings, in which—

Figure 1 is a vertical section of the entire machine set to operate in one direction only, a section of the machine itself being mounted in such manner as to allow it to be turned upon a center and be operated in the opposite direction. Fig. 2 is a vertical section of the pneumatic pipe or machine without the additional pipe inserted necessary to give direction to the current or volume of air admitted through the opening E. Fig. 3 is a vertical section of the additional pneumatic pipe, also lug, nut, screw, and wheel, which section is inserted (either fixedly or movable) in the pneumatic pipe, Fig. 2, in order to give direction to the current of air in said pneumatic pipe, as desired. Fig. 4 is a vertical section of the entire machine with the movable or additional pipe, Fig. 3, inserted in the pneumatic pipe, and lug, nut, screw, wheel for changing the position of said movable pipe, and as a result the direction of the current of air or gas entering said pneumatic pipe through the opening E.

Similar letters refer to similar parts throughout the several views.

A B is the pneumatic pipe or conduit.

L L is a space or reservoir between a portion of the outside of the additional pipe H H and a portion of the inside of said pipe A B, a portion of said pipe (said additional pipe) being telescoped or projected into the pneumatic pipe, Fig. 1, in such manner as to leave said space L L, said projected or telescoped portion of said pipe being either fixed or movable, as hereinafter described. E is the opening into said space L L or reservoir, through which said space or reservoir is supplied through suitable connection with a volume of compressed air, gas, or other fluid. S S is the place of discharge of said air, gas, or fluid from said space L L in the direction F B. F is the point near which the air or gas so discharged or escaping through the point S S unites in its onward progress through said pneumatic pipe in the general direction S F B. C C D D C C is an enlargement of said pneumatic pipe A B or place of inclosure of said space or reservoir L L. K is the center support or pin upon which a section of said pneumatic pipe (being said machine, Fig. 1) may be turned and again connected with said pipe. M is a plane for removing or exhausting a current of air from said pipe. Z is a valve by means of which said pipe A B can be closed, as at M. The pipe I I is a connecting-pipe, through which air, gas, or other elastic fluid exhausted through the opening M, Fig. 1, is again impelled into or forced into the pneumatic pipe A B through the opening E, reservoir L L, and aperture S S. J is an air-pump or other suitable apparatus through which said air is exhausted and impelled, as aforesaid. H H, Fig. 3, is a pipe (movable, if desired) inserted in said pneumatic pipe A B in such manner as to change and for the purpose of changing at will the direction of the current of air in said pneumatic pipe by moving said pipe H H either backward or forward in said pneumatic pipe A B, or by revolving a section of pipe half-way around upon the pin K. V is a pipe having one end closed and the other end firmly attached by an air-tight joint to said pneumatic pipe A B about midway between said points D D and communicating with the interior of said pneumatic pipe through a slot or opening made in said pipe A B, which said slot is covered by said pipe V. G is a thin piece of metal or lug moving in said slot or opening and having one end thereof firmly attached to and near the center of the outside of said movable pipe H H, and the other end thereof formed into a threaded eye or nut, into which nut the screw W is inserted. W is a threaded screw passing through said pipe V parallel with said pipe A B, and also through said threaded eye or nut. Said screw is furnished with a wheel or lever P, by means of which said screw is turned either forward or backward, as desired, and acting upon said pipe H H through said nut in said lug G. Said pipe H H is advanced in the direction desired to a close-fitting connection with the interior of said pipe A B near the point C C, at the same time leaving an opening from said reservoir L L at the point S S. Said pipe H H may also be moved, as aforesaid, by substituting a sliding bar in place of said screw, in which event said lug is so attached to said bar as to move therewith when the same is impelled forward or backward.

The manner of constructing and operating the machine may be briefly described as follows—that is to say, that portion of said pneumatic pipe shown in the accompanying drawings, included by and between the letters or points C C C C, is made larger than the remaining portion of said pipe so shown in said drawings as aforesaid. From the points D D D D the pipe gradually becomes smaller or tapers until it reaches the points C C C C. From the points X X to the points S S, Fig. 1, a section of pipe or additional pipe H H (which may be substantially the same size as the remaining smaller portions of said pipe) may be inserted in said first-described or enlarged portion of said pipe A B in such manner as to form a continuous pipe A C C H H S S, leaving a space or reservoir around or surrounding the exterior surface of said pipe H H, so inserted as aforesaid, and between the interior surface of said enlargement of said pipes C C C C with an opening from said space L L at the point or end S S of said pipe H H into the pipe A B in the general direction L S F B. Said space L L has an opening E, through which, by suitable connections, said space or reservoir is supplied with a current or volume of air, gas, or other fluid, as hereinafter mentioned. Said pneumatic pipe A B may also be constructed in such manner as to have one or more openings M, through which a portion, or substantially all, of the air in a section of said pneumatic pipe may be exhausted, if desired. Said pneumatic pipe A B may also be constructed in such manner as to have one or more openings M and connecting-pipes I I, through which a portion, or substantially all, of the air, gas, or other fluid arriving in a section of said pneumatic pipe, as at M, Fig. 1, may be exhausted or received and be again impelled into said pipe A B through the connecting-pipe I I, opening E, reservoir or space L L, and aperture S S by the use of the air-pump or apparatus J.

The machine is constructed in such manner that it may be detached from its position in a pneumatic line or pipe and turned or reversed upon the bed and pin K, in which event the machine is held in proper position during the process of turning by said pin, which pin may be inserted in said bed and in the side or bottom of said pipe A B in such manner as to allow said machine to be detached and turned around or reversed, as aforesaid, and again inserted and securely fastened in and as a continuous part of said pneumatic line or pipe.

A more convenient method of constructing said machine, so as to be capable of being reversed or operated in either direction, is to firmly attach to said pipe A B a short pipe or dome V, (having the outer end thereof closed,) and at a point about midway between said points D D the open end of said pipe V communicates with the interior of said space L L through a slot or opening made in said enlarged pipe, said slot being covered by said pipe V. A thin piece of metal or lug G is inserted in said slot or aperture in such manner as to allow the same to be moved or slid toward the ends of said pipe A B. One end of said lug G is firmly attached to and near the center of the outside of said movable pipe H H, and the other end of said lug G is formed into a threaded eye or nut. A screw W is then made, being threaded at the center in such manner as to fit or work in said nut, and a hole of suitable size is made through said pipe V at a proper distance from the end thereof and parallel with the length of said pipe A B and slot so made, as aforesaid. Said screw is then inserted in said hole in said pipe V and into said nut so formed as aforesaid in said lug, and again through the other or remaining wall of said pipe V, whereupon said screw is fastened in such manner as to prevent it moving endwise in said pipe V upon being revolved upon its axis by the wheel or lever P at the end of said screw. A sliding bar may also be used in place of said screw, in which event said lug is annexed or fastened to said bar in such manner as to move with said sliding bar when the same is moved either forward or backward in said dome V. The exterior surface of the ends of said pipe H H are rounded off or chamfered in such manner as to form substantially a smooth and airtight joint between the end of said movable pipe H H and said pipe A B when said pipe H H is moved either forward or backward, so as to have the end thereof come in contact with the enlarged pipe at C C. Said movable pipe H H is a little shorter than the portion of said enlarged pipe included between the points or letters C C C C. Stations or places may be established at any desired point or points upon the pneumatic line or pipe for the introduction into said pipe of the matter to be transported through a self-closing or other valve or receptacle. The matter or commodity to be transported is also introduced and started in transportation at and near the end of said pneumatic pipe.

In operating the machine the lever or wheel P is turned or revolved until it, operating upon said screw W and lug G, has placed said movable pipe into close connection at one end thereof with the pneumatic pipe A B, leaving the opening S S. In case a sliding bar is used instead of said screw said bar is forced either forward or backward, as desired.

The space L L is supplied through the pipe or opening E, (by suitable valve, pipe, hose, or other connections,) either by blast-engines or other suitable apparatus, with a continuous volume or current of compressed air, gas, or other fluid, which said compressed air, gas, or fluid is forced into or allowed to escape through the opening or aperture S S in the direction F at exceeding great velocity. The hollow shell or column of air escaping or advancing at great velocity from the space L L through the aperture S S will, by the conical or funnel-shaped sides or wall of said pipe A B, (at said point of escape,) as at D D C C, be forced toward a common center near the point F, and no particle of said escaping air, gas, or other elastic fluid will have time to recoil through the pipe A B in the direction F X A before being struck or impinged upon by other advancing particles of said air, gas, or other fluid, and as a result a current of air, gas, or other fluid, as the case may be, will be established in said pipe in the general direction desired, as S S F B. If the air or gas is allowed to enter through said aperture S S, as above described, at exceeding great velocity, a partial vacuum will be formed between the points A and F, and as a result of such vacuum a current of air, gas, or other fluid, will be established throughout the whole length of said pneumatic pipe, and this without regard to the place on said line where said machine is operated, and so it will be even if both ends of said pneumatic pipe be open and unobstructed, thus enabling the transmission without stop or hinderance of the mails, grain, flour, or other suitable commodity in course of transportation through said pneumatic pipes to or from any distance desired and at any required speed.

Two or more of said machines may be located upon the same pneumatic line, and thereby the velocity of the current of air and article in said pneumatic pipe in transit be increased to any required degree, the velocity depending solely upon the number, capacity, and energy of the machines so operated, as aforesaid. At the time said compressed air, gas, or other elastic fluid is allowed to escape through the aperture S S, as hereinbefore described, the air or gas or other elastic fluid arriving in that portion of said pneumatic pipe marked A M in the general direction A F B, Fig. 1, if desired, is, so far as is practicable, exhausted or removed from said pipe A B by suitable exhaust apparatus through the aperture M. Said current of air, gas, or other fluid is also, when desired, withdrawn or exhausted at or near the terminus of the line or point of arrival for matter in transit. When it is not desired to exhaust the air, gas, or other fluid through the aperture M, said aperture is closed by the valve Z. When it is desired to reverse the current of air, gas, or other fluid in said pipe A B, or to operate said pneumatic pipe-line in the opposite direction from that last mentioned, said machine is revolved half-way around upon said bed and pin K and again connected with said line, or said bar is slid in, or said screw is turned in the opposite direction from that last mentioned until said movable pipe H H shall come in contact at the other or remote end thereof with said pneumatic pipe A B at or near the point C C. Of course all joints, apertures, fittings, valves, and connections are made by suitable rubber packing or otherwise as nearly air-tight as is practicable.

I am aware that prior to this my invention pneumatic conveyers have been made, whereby the current of air in the pneumatic pipe has been created by withdrawing or exhausting the air at one end of the pneumatic pipe and by forcing the air into said pipe at the other or remote end thereof. I do not, therefore, here and now claim as my invention such a combination, broadly.

What I do claim as my invention, and desire to secure by Letters Patent, is—

1. The pneumatic pipe A B, having a place of supply E, a funnel-shaped enlargement C C C C, and the pipe H H therein inserted in such manner as to leave the space or reservoir L L surrounding said pipe H H and the place of discharge from said space or reservoir S S.

2. The pneumatic pipe A B, having a place of supply E, with valve N, a funnel-shaped enlargement or reservoir C C C C, and the pipe H H therein inserted in such manner as to leave the space or reservoir L L surrounding the sides of said pipe H H, and the place of discharge S S from said space or reservoir L L, and the aperture M, with valve Z.

3. The pneumatic pipe A B, having a place of supply E, with valve N, a double funnel-shaped enlargement, space, or reservoir C C D D D D C C, and the movable pipe H H therein inserted in such manner as to leave the space or reservoir L L and the place of discharge S S from said space or reservoir, the slot in said pipe A B, the lug G, annexed to said pipe H H, the eye or threaded nut in said lug, the screw or bar W, and lever or wheel P, and the pipe or dome V, through which said screw or bar is operated, and said pipe H H is advanced either forward or backward, as desired.

4. The pipe H H, placed within a reservoir or conical or funnel-shaped enlargement of said pneumatic pipe A B in such manner as to leave the space L L and the place of discharge S S, the surface of the ends of said pipe H H being packed, beveled, or chamfered so as to form substantially an air-tight joint between said beveled ends and said funnel-shaped surface of said pipe A B upon said pipe H H being pressed either forward or backward so as to come in contact with said surface.

5. The pipe H H, inserted within a larger pneumatic pipe tapered substantially to the same interior diameter as said pipe H H, and one end of said pipe H H being annexed to the interior of said larger pipe A B, leaving the space or reservoir L L and place of discharge S S.

JAMES W. BEACH.

Witnesses:
WM. M. RHEEM,
WM. H. SCOTT.